(12) United States Patent
Crombez et al.

(10) Patent No.: US 9,981,649 B2
(45) Date of Patent: May 29, 2018

(54) SYSTEM AND METHOD FOR CONTROLLING A BRAKE SYSTEM IN A VEHICLE

(75) Inventors: Dale Scott Crombez, Livonia, MI (US); Scott J. Lauffer, Northville, MI (US); Andy Chuan Hsia, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 332 days.

(21) Appl. No.: 13/602,370

(22) Filed: Sep. 4, 2012

(65) Prior Publication Data

US 2013/0297165 A1 Nov. 7, 2013

Related U.S. Application Data

(60) Provisional application No. 61/643,669, filed on May 7, 2012.

(51) Int. Cl.
| | |
|---|---|
| *B60W 10/18* | (2012.01) |
| *B60T 1/10* | (2006.01) |
| *B60T 7/04* | (2006.01) |
| *B60T 13/58* | (2006.01) |
| *B60T 13/66* | (2006.01) |
| *B60W 30/18* | (2012.01) |

(52) U.S. Cl.
CPC ............ *B60W 10/18* (2013.01); *B60T 1/10* (2013.01); *B60T 7/042* (2013.01); *B60T 13/585* (2013.01); *B60T 13/662* (2013.01); *B60W 30/18127* (2013.01); *B60T 2270/604* (2013.01); *B60W 2540/12* (2013.01); *B60Y 2300/89* (2013.01)

(58) Field of Classification Search
None
See application file for complete search history.

(56) References Cited

U.S. PATENT DOCUMENTS

| | | | |
|---|---|---|---|
| 4,512,615 | A | 4/1985 | Kita et al. |
| 5,816,666 | A | 10/1998 | Wiss |
| 5,915,801 | A | 6/1999 | Taga et al. |
| 5,938,295 | A | 8/1999 | Stumpe et al. |

(Continued)

FOREIGN PATENT DOCUMENTS

| | | |
|---|---|---|
| CN | 1640739 A | 7/2005 |
| CN | 1647968 A | 8/2005 |
| CN | 101229808 A | 7/2008 |

OTHER PUBLICATIONS

Office Action dated Aug. 25, 2016 in co-pending Chinese Patent Application No. 201310168132.0.

(Continued)

*Primary Examiner* — Jonathan M Dager
*Assistant Examiner* — Garrett F Evans
(74) *Attorney, Agent, or Firm* — David B. Kelley; Brooks Kushman P.C.

(57) ABSTRACT

A method for controlling a brake system in a vehicle includes providing a first non-friction braking torque for an axle of the vehicle when the vehicle has a first load. A second non-friction braking torque lower than the first non-friction braking torque is provided for the axle when the vehicle has a second load lower than the first load. Non-friction braking at the axle is limited by the first and second non-friction braking torques when the vehicle has the first and second loads, respectively.

20 Claims, 4 Drawing Sheets

(56) References Cited

U.S. PATENT DOCUMENTS

| | | | |
|---|---|---|---|
| 6,089,679 A * | 7/2000 | Kushi et al. | 303/113.5 |
| 6,367,889 B1 | 4/2002 | Tsubouchi et al. | |
| 6,457,784 B1 | 10/2002 | Bohm et al. | |
| 7,136,737 B2 | 11/2006 | Ashizawa et al. | |
| 7,152,934 B2 * | 12/2006 | Fuhrer et al. | 303/152 |
| 7,409,280 B2 | 8/2008 | Nakamura et al. | |
| 8,066,339 B2 | 11/2011 | Crombez et al. | |
| 8,126,618 B2 | 2/2012 | Yamada et al. | |
| 8,152,245 B2 | 4/2012 | Lubbers | |
| 8,165,747 B2 | 4/2012 | Ueno et al. | |
| 2003/0234577 A1 | 12/2003 | Crombez | |
| 2004/0238244 A1 | 12/2004 | Amanuma et al. | |
| 2008/0009996 A1 * | 1/2008 | Saito et al. | 701/70 |
| 2008/0100129 A1 * | 5/2008 | Lubbers | 303/113.1 |
| 2009/0145673 A1 | 6/2009 | Soliman et al. | |
| 2012/0053796 A1 | 3/2012 | Fleming et al. | |
| 2013/0297164 A1 | 11/2013 | Lauffer et al. | |

OTHER PUBLICATIONS

Office Action dated Apr. 13, 2017 in co-pending Chinese Patent App. No. 201310168492.0.
Office Action dated Mar. 21, 2018 in co-pending Chinese Patent App. No. 201310168492.0.

* cited by examiner

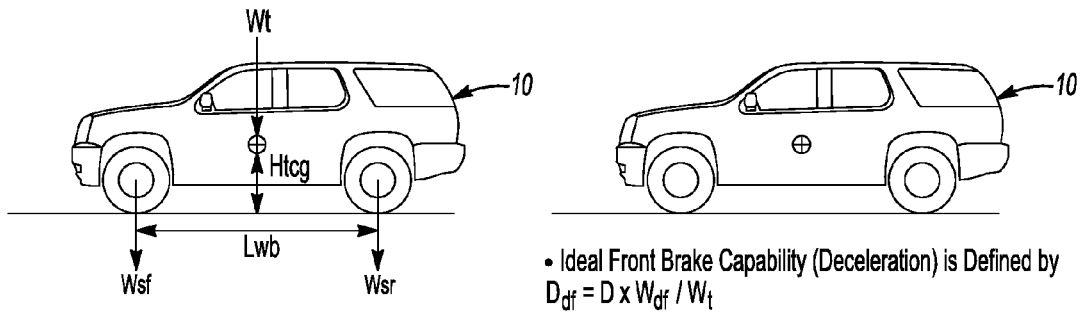

- Dynamic Front Weight is Defined by
$W_{df} = W_{sf} + ((W_t \times Ht_{cg})/L_{wb}) \times D$
 Where:
 $W_{df}$ = Dynamic Front Weight
 $W_{sf}$ = Static Front Weight
 $W_t$ = Total Weight = Static Front Weight + Static Rear Weight ($W_{sr}$)
 $Ht_{cg}$ = Center of Gravity Height
 $L_{wb}$ = Length of the Wheel Base
 D = Deceleration

*Fig-3*

- Ideal Front Brake Capability (Deceleration) is Defined by
$D_{df} = D \times W_{df} / W_t$
 Where:
 $D_{df}$ = Dynamic Front Deceleration
 D = Deceleration
 $W_{df}$ = Dynamic Front Weight (from Fig 3)
 $W_t$ = Total Weight
- Ideal Rear Brake Capability (Deceleration) is Defined by
$D_{dr} = D - D_{df}$

*Fig-4*

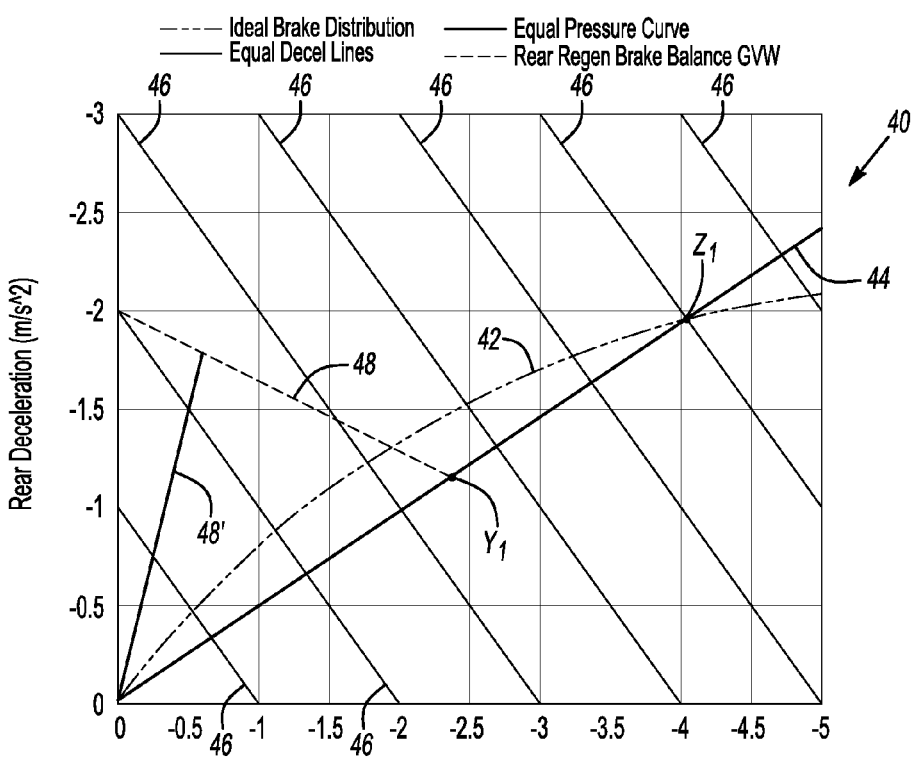

*Fig-5*

SYSTEM AND METHOD FOR CONTROLLING A BRAKE SYSTEM IN A VEHICLE

CROSS-REFERENCE TO RELATED APPLICATIONS

This application claims the benefit of U.S. provisional patent application No. 61/643,669 filed 7 May 2012, which is hereby incorporated herein by reference.

TECHNICAL FIELD

The present invention relates to a system and method for controlling a brake system in a vehicle.

BACKGROUND

Vehicles today are increasingly equipped with electric drive motors, which, in addition to propelling the vehicle, can capture braking energy to charge a battery. Depending on how the vehicle powertrain is configured, this process, known as "regenerative braking", can occur at the front axle, the rear axle, or both. There are other kinds of non-friction braking, for example, engine braking, which occurs when the compression of the engine provides a negative torque to the vehicle drive axles. Where the engine is only connected to one axle, as in a two-wheel-drive vehicle, or where the regenerative braking is only available at one axle, there may be competing interests between trying to brake in such a way as to maximize non-friction braking, for example, to maximize energy capture in a regenerative brake system, and more evenly distributing braking torque between the front and rear axles to provide better vehicle handling.

Adding complexity to the braking control system is consideration of the vehicle load. This may be of particular concern with commercial vehicles where the difference between the loaded weight and unloaded weight is significant. If, for example, a brake system is configured to maximize non-friction braking at the rear axle for the fully loaded vehicle, the brake system may over brake at the rear axle when the vehicle is unloaded. In addition, if the brake pedal travel is mapped the same for the loaded and unloaded conditions, the brake pedal may be "too sensitive" when the vehicle is in the unloaded condition—i.e., a very hard braking may occur for a very small amount of pedal travel. Conversely, if the brake system is configured to maximize non-friction braking at the rear axle for the unloaded vehicle, the brake system may not utilize all of the available non-friction braking—e.g., it may not capture all of the possible regenerative braking—when the vehicle is loaded. This may be due, in part, to the lack of sensitivity of the brake pedal, which now may need to be depressed so far as to engage the vehicle's friction brakes before all of the available non-friction braking energy is utilized.

SUMMARY

Embodiments of the present invention include a method for controlling a brake system in a vehicle. The method includes limiting non-friction braking at an axle of the vehicle by a first non-friction braking torque when the vehicle has a first load, and by a second non-friction braking torque lower than the first non-friction braking torque when the vehicle has a second load lower than the first load.

Embodiments of the present invention include a method for controlling a brake system in a vehicle. The method includes providing a plurality of non-friction braking torques for an axle of the vehicle; each of the non-friction braking torques are a function of vehicle load. The non-friction braking torques are used as non-friction braking limits for the axle when the vehicle has respective vehicle loads.

Embodiments of the present invention include a control system for controlling a brake system in a vehicle. The control system includes a controller configured to control vehicle braking to limit non-friction braking for a vehicle axle to an associated non-friction braking torque limit as a function of vehicle load.

BRIEF DESCRIPTION OF THE DRAWINGS

FIG. 3 shows a vehicle and method for calculating an ideal brake capability;

FIG. 4 shows more of the method shown in FIG. 3;

FIG. 5 shows a brake distribution chart for a vehicle in a fully loaded condition;

FIG. 6 shows a brake distribution chart for the vehicle in an unloaded condition using the same braking torque control as shown in FIG. 5;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
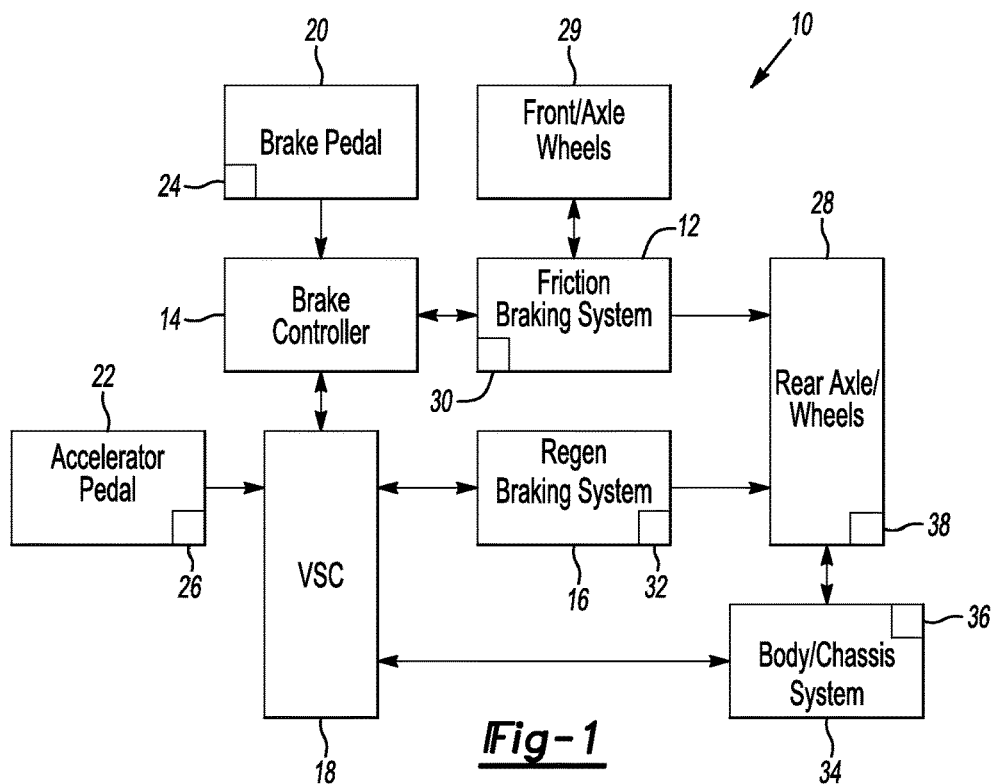
FIG. 1 shows a simplified schematic diagram of a vehicle having a control system in accordance with embodiments of the present invention.

FIG. 1 shows a simplified schematic diagram of a portion of a vehicle 10. The vehicle 10 includes a friction brake system 12, controlled by a brake controller 14, and a non-friction regenerative brake system 16, which is part of the vehicle powertrain. The regenerative brake system 16 includes one or more electric machines, such as electric motors, which are operable to provide regenerative braking for the vehicle 10. The regenerative brake system 16 is controlled by a control system, or vehicle system controller (VSC) 18, which communicates with the brake controller 14, for example, through a controller area network (CAN). The VSC 18 may include other controllers, such as a powertrain control module (PCM), and in some embodiments, the brake controller 14 may be integrated into the VSC 18. Thus, a control system in accordance with embodiments of the present invention may control various systems within the vehicle 10 by using a single controller, separate software controllers within a single hardware device, or a combination of separate software and hardware controllers.

The brake controller 14 receives vehicle operator inputs from a brake pedal 20, and the VSC 18 receives operator inputs from an accelerator pedal 22. A brake sensor 24 (which can be more than one sensor), is configured to detect the position of the brake pedal 20, and send one or more signals to the brake controller 14. Similarly, an accelerator pedal sensor 26 (which can also be more than one sensor), is configured to detect the position of the accelerator pedal 22, and send one or more signals to the VSC 18. The VSC 18 and the brake controller 14 use various inputs, including the inputs from the sensors 24, 26, to decide how to control the friction brake system 12 and the regenerative brake system 16. The friction brake system 12 operates to slow the speed of rear axle/wheels 28 and front axle/wheels 29 through the application of one or more friction elements in accordance with methods known in the art. The regenerative brake system 16 is also operable to reduce the speed of the rear axle/wheels 28 by having at least one electric motor produce a negative torque which is transferred through the powertrain to the rear axle/wheels 28.

The friction brake system 12 includes one or more sensors, represented in FIG. 1 by a single sensor 30. The sensor 30 is configured to send signals to the brake controller 14 related to various conditions within the friction brake system 12. For example, if the friction brake system 12 should experience reduced braking capability, perhaps due to a loss of boost or the loss of a hydraulic circuit, the sensor 30 can communicate this condition to the brake controller 14, which in turn communicates with the VSC 18. Similarly, the regenerative brake system 16 has one or more sensors, represented in FIG. 1 by the sensor 32. The sensor 32 may detect such conditions as motor speed, motor torque, power, etc. The sensor 32 communicates directly with the VSC 18, which can use these inputs in combination with the other inputs to control the brake systems 12, 16.

The vehicle 10 also includes a body/chassis system 34. The body/chassis system 34 includes structural elements of the vehicle 10, including such things as a vehicle suspension system. The rear axle/wheels 28, shown separately in FIG. 1, may be considered a part of the larger body/chassis system 34. One or more sensors, shown in FIG. 1 as a single sensor 36, are configured to detect various conditions of the body/chassis system 34, and to communicate with the VSC 18. The sensor 36 may detect such conditions as the deflection of, or the load on, various elements of the body/chassis system 34, as well as load distribution. Similarly, a sensor 38, which represents one or more sensors, is configured to detect conditions of the rear axle/wheels 28, including the axle speed. The sensor 38 is shown in FIG. 1 communicating with the larger body/chassis system 34, which in turn communicates with the VSC 18. Alternatively, the sensor 38 can be directly connected to the VSC 18.

In the embodiment shown in FIG. 1, the regenerative brake system 16 is a rear-axle system, configured to capture braking energy from the rear axle/wheels 28 only. Although embodiments of the invention are described and illustrated in conjunction with a rear axle regenerative brake system, other embodiments may include other types of non-friction braking, such as engine braking, and may also include front axle or four-wheel (two-axle) non-friction brake systems. As discussed above, it is often desirable to capture as much braking energy as possible, while not allowing too great a difference in braking distribution between the front and rear brakes so as to affect vehicle handling. Toward that end, a controller, such as the VSC 18, can be programmed to perform a number of steps in accordance with embodiments of the present invention.

Initially, a first non-friction braking torque, which in this embodiment is a maximum desired regenerative braking torque, for the rear axle 28 can be provided when the vehicle 10 has a first load, which, for example, may be a maximum capacity load conveniently identified by the vehicle's "gross vehicle weight" (GVW). As discussed in more detail below, the first non-friction braking torque is, in this embodiment, a function of an ideal brake distribution curve for the given vehicle loading. Therefore, the first non-friction braking torque is also a function of vehicle load.

Figure 2:
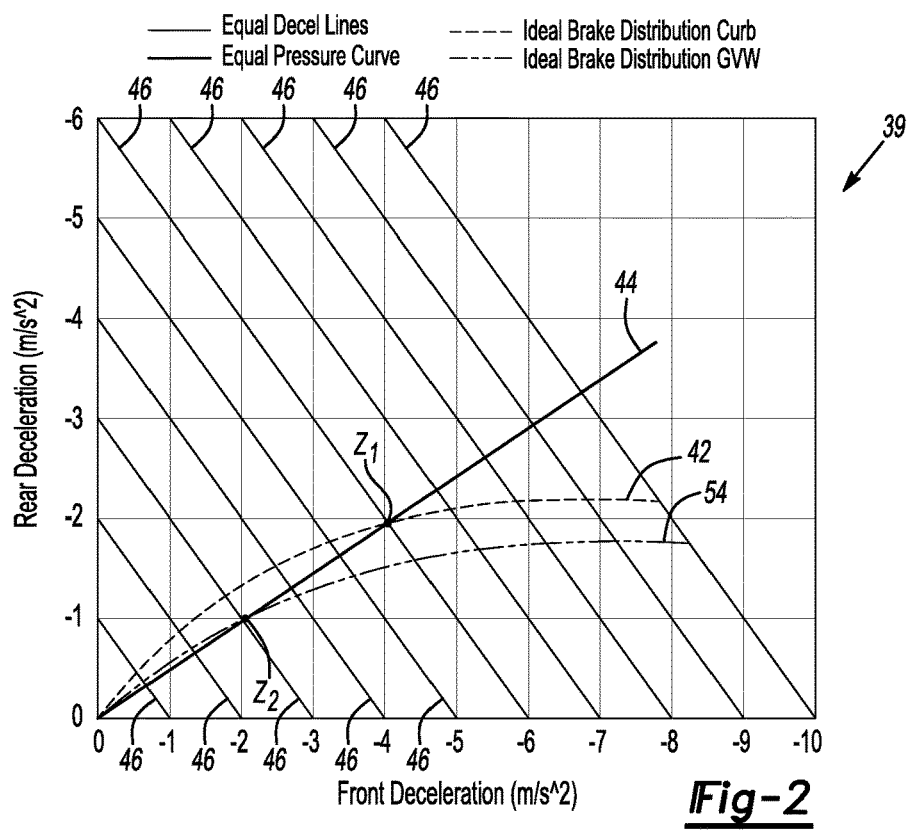
FIG. 2 shows ideal brake distribution curves for a vehicle in a fully loaded condition and in an unloaded condition.

FIG. 2 shows a brake distribution chart 39 for the vehicle 10, and in particular shows "Ideal Brake Distribution" curves for two different loading conditions. The curve 42 shows an Ideal Brake Distribution for a first load, which in this case, may be the vehicle's GVW of 3000 kilograms (kg). The curve 54 shows an Ideal Brake Distribution for a second load, which in this case, may be the vehicle's "curb weight", or unloaded weight of 2100 kg. Ideal brake distribution curves, such as the curves 42, 54, illustrate theoretical lines along which the front and rear brakes would lock-up simultaneously under the given loading condition. For purposes of the present example, the ideal brake distribution curve 42 represents a first braking balance between the front and rear vehicle axles 28, 29 when the vehicle 10 has the first load. Likewise, the ideal brake distribution curve 54 represents a second braking balance between the front and rear vehicle axles 28, 29 when the vehicle 10 has the second load.

Although the fully loaded GVW weight and the unloaded curb weight are used in the examples described and illustrated herein, it is understood that embodiments of the invention may be applied to any or all of the various loading conditions that may exist between these two extremes. The chart 39 illustrates a rear deceleration for the vehicle 10 along the vertical axis, and a front deceleration along the horizontal axis. The sum of these two decelerations is the total deceleration for the vehicle 10, which can be easily converted into a vehicle braking force or a vehicle braking torque because there is a known relationship between each of these values.

An equal pressure curve 44 is also illustrated in the chart 39, and represents a line of equal brake pressure balance, that is, a line of braking torques along which equal pressure is applied to both of the front and the rear brakes. The ideal brake distribution curves 42, 54 are not coincident with the equal pressure curve 44, because in practice, a vehicle does not have an equal weight distribution between the front and rear axles. As shown in FIG. 2, the lines 42, 44 cross at point $Z_1$, and the lines 54, 44 cross at point $Z_2$; these points of intersection may represent different braking torque values for different vehicles and different loading conditions of the same vehicle. A number of equal deceleration lines 46 are also illustrated in the chart 39, and indicate lines along which the front and rear axles of the vehicle 10 are decelerating equally. Ideal pressure curves may be generated for a vehicle, for example, according to the formulas illustrated in FIGS. 3 and 4, which can be applied to the vehicle 10.

As shown in FIGS. 3 and 4, the ideal pressure curves 42, 54 are functions of a number of vehicle parameters. For example, as shown in FIG. 4, the ideal front braking capability ($D_{df}$) is a function of the vehicle deceleration (D) as well as the dynamic front weight ($W_{df}$) and the total weight ($W_t$) of the vehicle 10. Because the total deceleration (D) is the sum of the front and rear decelerations, the ideal rear braking capability is defined as the ideal front braking capability ($D_{df}$) subtracted from the total vehicle deceleration (D)—see FIG. 4. A calculation for the dynamic front weight ($W_{df}$) is illustrated in FIG. 3, where it is shown to be a function of the static front weight ($W_{sf}$), the total vehicle weight ($W_t$), the height of the center of gravity for the vehicle ($Ht_{cg}$), the vehicle wheelbase ($L_{wb}$) and the total vehicle deceleration (D).

As described above, it may be desirable to optimize the use of non-friction braking. In the case of regenerative braking, this may be to capture as much energy as possible, while at the same time ensuring that there is not an undesirable impact on vehicle handling. For any given vehicle, and vehicle loading condition, the "optimum" amount of regenerative braking that can be captured can be estimated. Using the vehicle 10 at GVW as an example, a maximum amount of allowable rear regenerative braking torque is shown in the chart 40 by the maximum rear deceleration reached by line 48, which generally illustrates the rear regenerative braking balance for the vehicle 10 at GVW. In the chart 40, the maximum rear regenerative braking torque is shown as a rear deceleration of −2 meters per second squared (m/s^2). For the vehicle 10, this level of deceleration can be translated into a deceleration torque of approximately 1700 Newton-meters (Nm). After reaching this maximum value, the line 48 slopes downward and toward the right of the chart 40, indicating a combination of front and rear braking, until the equal pressure curve 44 is reached at point ($Y_1$). From there, the braking may follow the equal pressure curve, where friction braking is used exclusively until $Z_1$ is reached, at which point, braking methods known to those skilled in the art, such as electronic brake force distribution, may be employed to prevent rear axle wheel lockup.

The slope of the line 48 is generally less than the slope of the equal deceleration lines 46, and is brought below the ideal brake distribution curve 42 somewhere before the intersection point $Z_1$. The specific way in which the maximum rear braking torque (in this case −2 m/s^2) is chosen, and how the rest of the brake balance line (or curve) is determined, can be based on a number of factors. In the examples of embodiments of the present invention described herein, the optimum rear regenerative braking torque is chosen to provide a "maximum" amount of regenerative braking at the rear axle 28, while still providing a required level of vehicle handling. Although the first part of the curve 48 is vertical, indicating exclusive use of the rear brakes until a deceleration of −2 m/s^2 is reached, the initial deceleration may be chosen to include some front braking—see, e.g., the line 48', which intersects the sloping part of the line 48 and follows its path from there.

As braking occurs along the line 48', it may be a combination of friction and non-friction braking, or, in the case where non-friction braking is available at both axles, it may be exclusively non-friction braking. Therefore, in some embodiments non-friction braking at an axle may not reach the chosen non-friction braking torque; rather, the chosen non-friction braking torque may be used as a limiting value, such that the VSC 18 controls vehicle braking so that the non-friction braking at that particular axle does not exceed this limit. Moreover, when it is stated that regenerative or other non-friction braking occurs "until" some non-friction braking torque is reached, it does not mean that all non-friction braking ceases after this point. Referring to FIG. 5 for example, if the rear regenerative braking is used exclusively until a deceleration of −2 m/s^2 is reached, some non-friction braking may still occur as braking control moves along the sloped portion of the line 48; however, as seen from the chart 40, regenerative braking at the rear axle 28 does not exceed the first non-friction braking torque of −2 m/s^2.

As discussed above, embodiments of a method of the present invention may be executed, for example, by the VSC 18. One way that the VSC 18 may provide the first non-friction braking torque for the rear axle 28 of the vehicle 10 is to determine the intersection point $Z_1$ and work backwards until the maximum desired rear regenerative braking torque of −2 m/s^2 is determined. After determining the value of $Z_1$, the value of $Y_1$ can be determined; this point resides on the equal pressure curve 44, and is therefore a friction braking torque. For purposes of the present example, the braking torque represented by the point $Y_1$ is a first friction braking torque. In at least some embodiments, the first friction braking torque may be limited to be some percentage of the braking torque value represented by the intersection point $Z_1$. In the embodiment shown in FIG. 5, the intersection point $Z_1$ coincides with a total deceleration of approximately −6 m/s^2, which is the sum of −4 m/s^2 front deceleration and −2 m/s^2 rear deceleration. If, for example, the first friction braking torque was limited to a chosen percentage of the torque at $Z_1$ (for example seventy percent), the value of $Y_1$ would be chosen to be −4.2 m/s^2. In the embodiment shown in FIG. 5, however, the value of $Y_1$ is limited to be the lower of a fixed braking torque value of −3.5 m/s^2 or a chosen percentage of the torque at $Z_1$ (in this case seventy percent); therefore, as shown in FIG. 5, the value of $Y_1$ is −3.5 m/s^2, which is the sum of the rear deceleration −1.2 m/s^2 and front deceleration −2.3 m/s^2.

After the value of $Y_1$ is determined, the maximum regenerative rear braking torque of −2 m/s^2 can be chosen, for example, by making it a fraction or percentage of $Y_1$; in the embodiment shown in FIG. 5, the maximum regenerative rear braking torque is just under sixty percent of the torque at $Y_1$. With this method, the maximum regenerative rear braking torque, or more generically, the first non-friction braking torque, is a function of the ideal brake distribution curve 42; it is also a function of the equal pressure curve 44, and more specifically, a function of the intersection (point $Z_1$) of the ideal brake distribution curve 42 and the equal pressure curve 44.

Using information, for example, from the chart 40 in FIG. 5, the method may include braking the vehicle 10 exclusively at the rear axle 28 until the first rear braking torque (in this case −2 m/s^2) is reached. This level of rear braking torque is based on the vehicle 10 having a first load, which, as described above, is its GVW. One of the reasons that the chosen rear braking torque is load dependent, is because braking conditions change with a vehicle when it has a heavier load versus when it has a lighter load. This is illustrated in FIG. 6 where a braking distribution chart 50 for the vehicle 10 is shown when it has a second load lower than the first load; in this case the vehicle 10 is at its curb weight. In the chart 50, the equal deceleration lines 46 and equal pressure curve 44 are the same as in FIG. 5, while the brake balance curve 52 and ideal brake distribution curve 54 are different from their counterparts 48, 42 shown in FIG. 5.

If the same level of braking torque is applied to the vehicle 10 at its curb weight as was applied at GVW (1700 Nm, see above), the result is a greater rear deceleration as shown by the brake balance curve 52 in the chart 50 in FIG. 3. In this example, the rear deceleration has increased from −2 m/s^2 to −2.8 m/s^2, as indicated by the label "Overbraking Rear Axle". As discussed above, this level of rear braking may be undesirable. In particular, the intersection of the brake balance curve 52 and equal pressure curve 44

Figure 7:
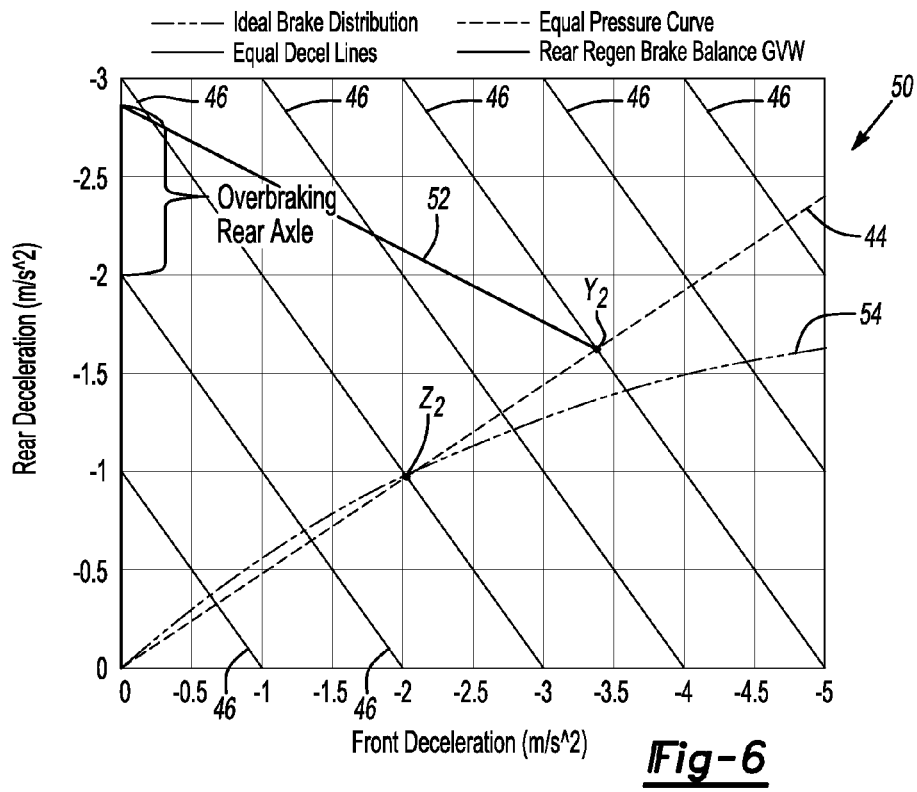
FIG. 7 shows a brake distribution chart for the vehicle in the unloaded condition using a different braking torque control.
Figure 7:
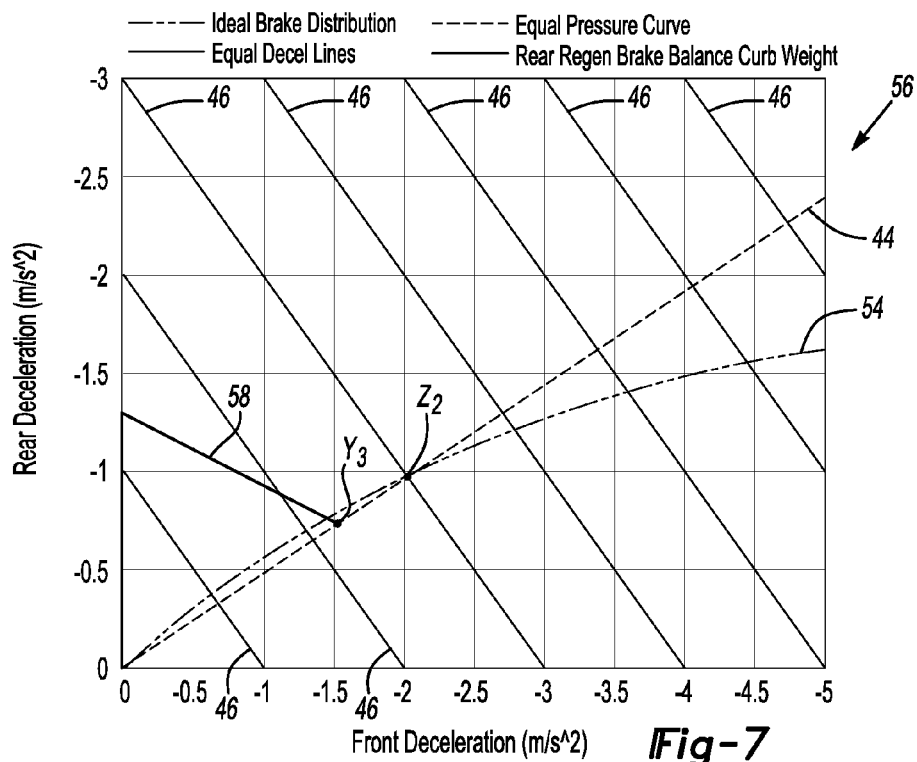

(point $Y_2$) is above the intersection of the ideal brake distribution curve 54 and the equal pressure curve 44 (point $Z_2$), which may be undesirable. Therefore, embodiments of the present invention may utilize different rear braking torques for different loading conditions of the same vehicle. This is illustrated in FIG. 7, which shows a braking distribution chart 56 for the vehicle 10 at the second loading condition, which is its curb weight. In this example, a second non-friction braking torque for the rear axle 28 has been chosen so as to provide the desired vehicle handling throughout the braking event; this is indicated by the brake balance curve 58.

As shown in the chart 56 in FIG. 7, the maximum rear deceleration is $-1.3$ m/s$^2$, which translates into a rear braking torque of approximately 900 Nm. Therefore, a system and/or method in accordance with embodiments of the present invention may provide a second non-friction braking torque (in this example a maximum desired regenerative braking torque) that is lower than the first non-friction braking torque when the vehicle has a second load lower than the first load. The method by which the second non-friction braking torque ($-1.3$ m/s$^2$) is determined may parallel the determination of the first non-friction braking torque described above. For example, the second non-friction braking torque ($-1.3$ m/s$^2$) may be a function of the ideal brake distribution curve 54, which is a second braking balance. It should be noted that although the first and second braking balances 42, 54 on which the first and second non-friction braking torques are based are the ideal brake balances for the respective vehicle loading, other embodiments may employ different braking balances (other than the ideal brake distribution) in a determination of the non-friction braking torques to be used in the brake control system.

In addition to being a function of the ideal brake distribution curve 54, the second non-friction braking torque is also a function of the equal pressure curve 44, and more specifically, a function of the intersection (point $Z_2$) of the ideal brake distribution curve 54 and the equal pressure curve 44. The intersection ($Y_3$) of the brake balance curve 58 and equal pressure curve 44 may be determined using the same formula described above—i.e., its value is the lower of seventy percent of the braking torque value of the intersection $Z_2$ and $-3.5$ m/s$^2$. In this example, the intersection $Z_2$ represents a deceleration torque of $-3$ m/s$^2$ (the sum of the front deceleration of $-2$ m/s$^2$ and the rear deceleration of $-1$ m/s$^2$). Because seventy percent of this value ($-2.1$ m/s$^2$) is lower than $-3.5$ m/s$^2$, it is the seventy percent value that is used.

When the vehicle 10 is at its curb weight, it is braked exclusively at the rear axle 28 only until the second rear braking torque of 900 Nm is reached (this is represented by the maximum rear deceleration of $-1.3$ m/s$^2$ shown in FIG. 7). After this maximum value is reached, braking continues along the sloped portion of the brake balance curve 58 until it reaches the intersection point $Y_3$, after which it follows the equal pressure curve 44, where only friction braking is employed. Just as the intersection point $Y_1$ represented a first friction braking torque, the intersection point $Y_3$ represents a second friction braking torque, which in this embodiment represents the end of non-friction regenerative braking and the beginning of all friction braking.

As described above, the first and second rear braking torques of 1700 Nm and 900 Nm represent maximum desired regenerative braking torques for the vehicle 10 for the two different loading conditions. Although the examples above rely on exclusive use of the rear brakes until the desired non-friction braking torque levels are reached, different embodiments may use a combination of front and rear brakes, such as described above in conjunction with the braking curve 48' shown in FIG. 5. In the case where non-friction braking is available at only one axle, a combination of non-friction and friction braking will occur until the first and second non-friction braking torques are reached. Referring to FIG. 5, the braking curve 48' does not reach the maximum deceleration of $-2$ m/s$^2$ before it slopes downward and toward the intersection point $Y_1$. This can be addressed in a number of ways. First, the line 48' could be allowed to continue until the maximum deceleration of $-2$ m/s$^2$ is reached, in which case the sloping portion of the line 48 would be somewhat steeper than is shown in FIG. 5; this may be acceptable, as long as it is not too steep—e.g., steeper than the equal deceleration lines 46. Alternatively, the determination of the maximum allowable non-friction braking torque at the rear axle 28 can be chosen to be a somewhat smaller percentage of the torque represented by the intersection point $Y_1$.

Figure 8:
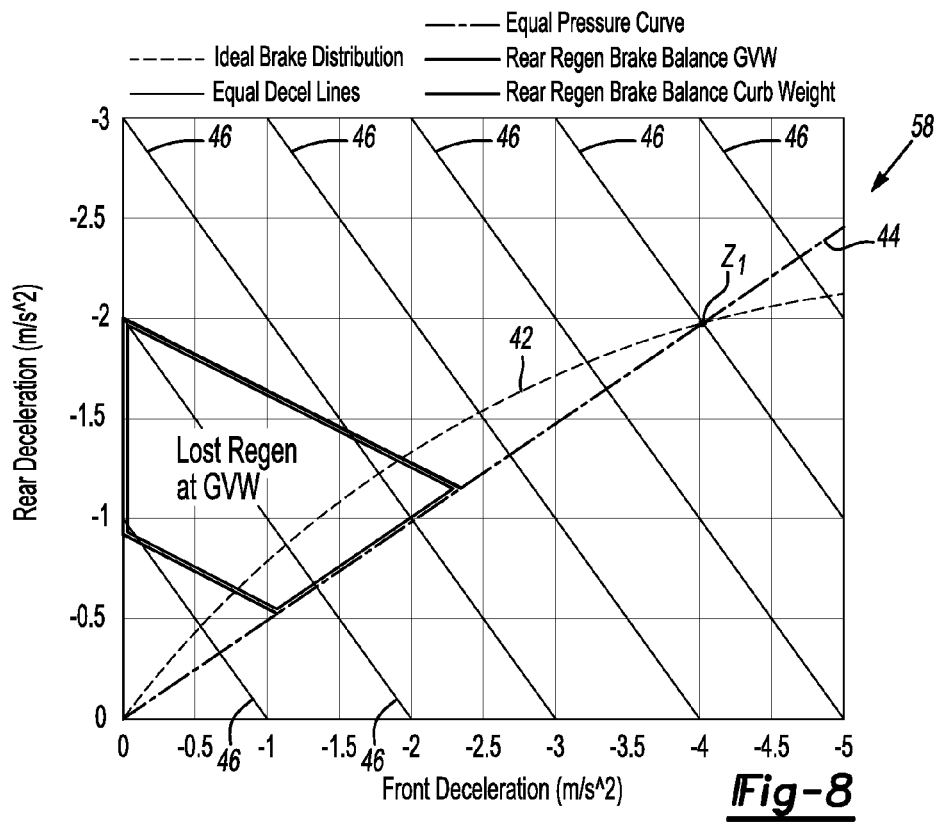
FIG. 8 shows a brake distribution chart for the vehicle in the loaded condition using the same braking torque control as shown in FIG. 7.

As described above, embodiments of the present invention can provide different rear braking torques for different loading conditions of a vehicle, such as the vehicle 10. Using the maximum allowable rear braking torque from a heavily loaded vehicle for the same vehicle at a lower load resulted in the undesirable effect of over braking the rear axle, which was illustrated and described in conjunction with FIG. 6. It is similarly undesirable to use the maximum rear braking torque provided for the lower load condition—such as illustrated and described in FIG. 7—when the vehicle has a higher load. This is illustrated in FIG. 8, where a region of lost regenerative braking energy is labeled "Lost Regen at GVW". This results from abandoning exclusive rear axle regenerative braking too soon—i.e., at a braking torque level that is below a desired level, which in this case is a maximum level that can be achieved while still obtaining a desired vehicle handling.

Figure 9:
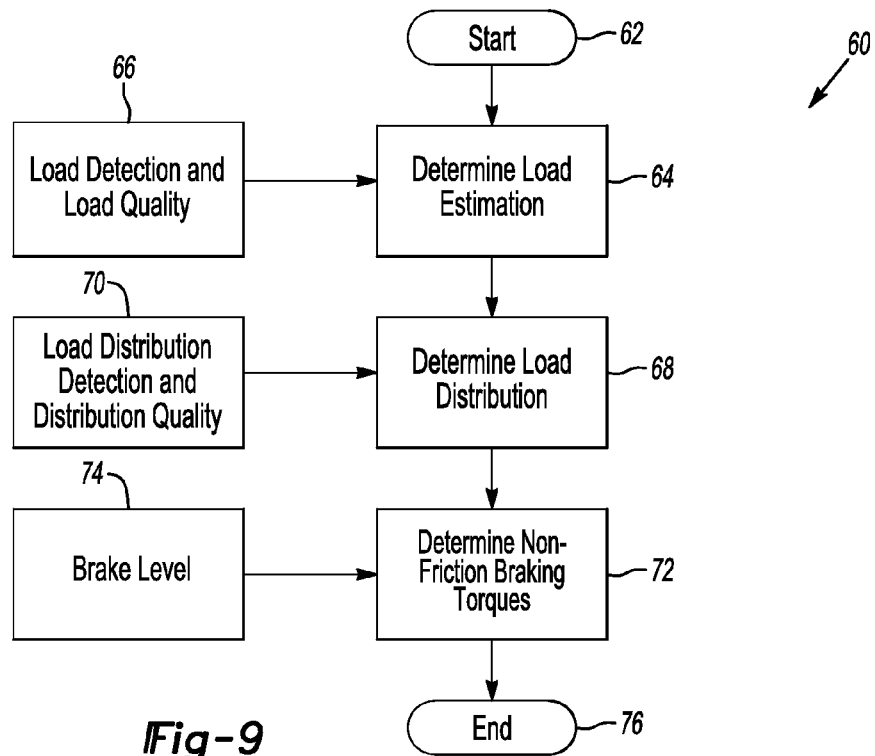
FIG. 9 shows a flowchart illustrating a method in accordance with embodiments of the present invention.

FIG. 9 shows a flowchart 60 summarizing a method and system in accordance with embodiments of the present invention. At step 62, the process is started, and at step 64 a determination is made as to load estimation for a vehicle, such as the vehicle 10. This load estimation comes from inputs 66, for example, to the VSC 18, that may provide information on the load level and "load quality". Information such as this can come from, for example, a sensor or sensors such as the sensor 36 shown in FIG. 1. A sensor that detects deflection levels of a suspension system is one example of a load detection sensor. The "load quality" factor may be provided to give an indication of the accuracy of the sensor itself, or the accuracy of the particular measurement as it relates to the vehicle load—i.e., a weight sensor may provide a higher quality measurement than a deflection sensor, which must be used in a calculation to estimate the actual load.

Next, at step 68, a load distribution is determined based on inputs 70 providing a front-to-back load distribution detection and distribution quality. When a vehicle load is distributed toward a front of the vehicle, which may be defined, for example, as in front of the rear axle, or in front of a center of gravity for the vehicle, it may not be possible to provide a desired level of braking torque at the rear axle without having an impact on vehicle handling. Therefore, a system and method in accordance with embodiments of the present invention may choose an initial value for the first rear braking torque, such as illustrated and described in FIG. 5, and may also choose an initial value for the second rear braking torque, such as illustrated and described in FIG. 7.

Next, if it is determined that the first or second loads are distributed toward a front of the vehicle, the first and second rear braking torques can be modified such that they are reduced to a somewhat lower level to account for the load distribution. Although the "second load" illustrated and described above was considered a zero payload for the vehicle 10, the center of gravity of the vehicle at curb weight may be distributed toward a front of the vehicle, and this may be considered in the determination of the second non-friction braking torque. At step 72, a determination of non-friction braking torques is made; this can be based on brake level indicated at 74, for example, from a brake pedal 20 and sensor 24 shown in FIG. 1. The process shown in FIG. 6 is ended at 76.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a brake system in a vehicle comprising:
   limiting non-friction braking at an axle of the vehicle by a first non-friction braking torque when the vehicle has a first load, and by a second non-friction braking torque lower than the first non-friction braking torque when the vehicle has a second load lower than the first load.

2. The method of claim 1, wherein the first non-friction braking torque is a function of a first braking balance between front and rear axles of the vehicle when the vehicle has the first load, and the second non-friction braking torque is a function of a second braking balance between front and rear axles of the vehicle when the vehicle has the second load.

3. The method of claim 2, wherein the first non-friction braking torque is further a function of an equal brake pressure balance wherein equal pressure is applied to friction brakes on front and rear axles of the vehicle, and the second non-friction braking torque is further a function of the equal brake pressure balance.

4. The method of claim 3, wherein the first non-friction braking torque is further a function of an intersection of the first braking balance and the equal brake pressure balance, and the second non-friction braking torque is further a function of an intersection of the second braking balance and the equal brake pressure balance.

5. The method of claim 4, further comprising:
   braking the vehicle with at least some non-friction braking until the first non-friction braking torque is reached at the axle when the vehicle has the first load; and
   braking the vehicle with at least some non-friction braking until the second non-friction braking torque is reached at the axle when the vehicle has the second load.

6. The method of claim 5, further comprising:
   reducing non-friction braking at the axle from the first non-friction braking torque to zero non-friction braking at a first friction braking torque when the vehicle has the first load; and
   reducing non-friction braking at the axle from the second non-friction braking torque to zero non-friction braking at a second friction braking torque when the vehicle has the second load, and
   wherein friction braking is used exclusively after the first and second friction braking torques are reached.

7. The method of claim 1, further comprising:
   choosing respective initial values for the first and second non-friction braking torques;
   reducing the value of the first non-friction braking torque from its initial value when the first load is distributed toward a front of the vehicle; and
   reducing the value of the second non-friction braking torque from its initial value when the second load is distributed toward a front of the vehicle.

8. A method for controlling a brake system in a vehicle comprising:
   providing a plurality of non-friction braking torques for an axle of the vehicle, each of the non-friction braking torques being a function of vehicle load; and
   using the non-friction braking torques as non-friction braking limits for the axle when the vehicle has respective vehicle loads.

9. The method of claim 8, wherein each of the non-friction braking torques is a function of an intersection of a respective ideal brake balance and an equal brake pressure balance.

10. The method of claim 9, wherein each respective ideal brake balance is a function of vehicle load.

11. The method of claim 10, further comprising providing a plurality of friction braking torques, each being a function of the intersection of a respective ideal brake balance and the equal brake pressure balance.

12. The method of claim 11, wherein each intersection of one of the ideal brake balances and the equal brake pressure balance defines a respective braking torque value, and each of the friction braking torques is limited to being no greater than a chosen percentage of the respective braking torque value.

13. The method of claim 12, wherein each of the friction braking torques is defined as the lower of the chosen percentage of the respective braking torque value and a fixed braking torque value.

14. The method of claim 8, further comprising:
   choosing respective initial values for the non-friction braking torques; and
   reducing the value of at least one of the non-friction braking torques from its respective initial value when a respective load is distributed toward a front of the vehicle.

15. A control system for controlling a brake system in a vehicle comprising:
   a controller configured to control vehicle braking to limit non-friction braking for a vehicle axle to an associated non-friction braking torque limit as a function of vehicle load, the controller limiting the non-friction braking for the vehicle axle to a first non-friction braking torque when the vehicle has a first load, and to a second non-friction braking torque lower than the first non-friction braking torque when the vehicle has a second load lower than the first load.

16. The control system of claim 15, wherein the controller is further configured to provide an ideal brake balance as a function of vehicle load, and to provide an equal brake pressure balance representing braking torques where equal pressure is applied to friction brakes on front and rear axles of the vehicles, and wherein the associated non-friction braking torque is a function of an intersection of a respective ideal brake balance and an equal brake pressure balance.

17. The control system of claim 16, wherein the controller is further configured to provide a plurality of friction braking torques, each of the friction braking torques being a function of the intersection of a respective ideal brake balance and the equal brake pressure balance.

18. The control system of claim 17, wherein each of the friction braking torques is defined as the lower of a chosen percentage of the respective braking torque value and a fixed braking torque value.

19. The control system of claim 17, wherein the controller is further configured to provide respective initial values for the non-friction braking torques, and to modify the initial value of at least one of the non-friction braking torques from its respective initial value based on a front-to-back distribution of the respective load.

20. The control system of claim 19, wherein the step of the controller modifying the initial value of at least one of the non-friction braking torques includes reducing the value of the at least one non-friction braking torque when a respective load is distributed toward a front of the vehicle.

* * * * *